UNITED STATES PATENT OFFICE.

KALMAN WARGA, OF BROOKLYN, NEW YORK.

ORNAMENTING AND PROTECTING METAL SURFACES.

1,230,958.  Specification of Letters Patent.  Patented June 26, 1917.

No Drawing.  Application filed January 10, 1917.  Serial No. 141,627.

*To all whom it may concern:*

Be it known that I, KALMAN WARGA, residing at Brooklyn, in the county of Kings and State of New York, a citizen of the United States, have invented or discovered certain new and useful Improvement in Ornamenting and Protecting Metal Surfaces, of which improvement the following is a specification.

On account of the brittleness of vitreous enamels, it has heretofore been necessary to apply such enamels to the surfaces of metal articles after the latter have been brought to final shape or form, as any substantial bending of the metal will cause a fracture, if not complete separation of a vitreous enamel from the surfaces to which it had been applied. The invention described herein is an improvement on the method described in application Serial Number 130,228, filed March 8th, 1916, and has for its object the formation of a flexible vitreous enamel on the surface of metal, thereby permitting of the shaping of an article by stamping, bending, etc., from metal having an enameled surface. The invention is hereinafter more fully described and claimed.

The material employed in forming an ornamental or protective coating, consists primarily of a material such as powdered glass or other vitrifiable or glass forming material, having such a low melting temperature, as to be capable of being fused and forming, when solidified, a smooth even coating. Mixtures of silica, red lead and borax, and silica, red lead and oxid of bismuth have been found suitable for the purposes of this invention, which however, are not limited to such specific glass-forming materials. It has been found that, if a thin or comparatively thin layer of material in a finely divided condition be brought into contact with the highly heated surface of an article formed of aluminum or of an aluminum alloy, or of a mixture of metals, one of which is aluminum, a tightly adherent coating will be formed. It is believed that when the article having the coating material thereon is raised to a sufficiently high temperature so that chemical reaction will occur between the oxid on the surface of the metal article and the overlying glass forming material, and as a result of such action and the heat to which it is subjected, such material will be vitrified and a compound formed which will act to cement the vitrified material to the metal. When applying the glass or other vitrifiable material, prior to heating the metal article, the material in a finely divided condition is mixed with a suitable liquid adhesive material, as varnish, gum-arabic, etc., and a thin or comparatively thin layer of the prepared material spread over the surface of the metal. The purpose of the adhesive is merely to hold the layer on the surface of the article while in position to be heated. If the use of an adhesive is undesirable, the surface metal of the article may be heated and the powdered glass or other material sprinkled on the heated surface. Or in lieu of mixing the powdered glass with the adhesive, the latter may be spread on the surface of the article and the finely divided glass sprinkled onto the prepared surface.

If a colored surface is desired, pulverized glass may be employed, or a clear glass or other vitrifiable material finely divided and mixed with a suitable pigment may be used in the manner described. It will be understood that the pigment should be of such a character that it will not be eliminated or injuriously affected by the heat employed, *i. e.*, from about five to seven hundred degrees C., and hence mineral salts such as metallic oxids are preferably employed. In some cases, a metal in a finely divided condition may be used as a pigment, as for example, a coating may be formed on an article containing aluminum by applying a layer consisting of a vitrifiable mixture such as hereinbefore specified and finely divided gold, to the surface of such article and subjecting it to a suitable heat.

It has been found that a vitreous coating applied to the surface of aluminum or an alloy of aluminum, in the manner described, will not be cracked or be detached when the surface is bent or flexed, and hence such enameled or coated metal can be formed into articles by stamping, bending, etc. It will be understood that shaped articles can be advantageously treated as described, especially containers, for the reason that the denting or other distortion of the vessel will not produce cracks or flaking off of the protective coating.

It has been found that if sufficiently large percentages of filling, such as metal or metal salts, be mingled with the vitrifiable material, the latter when fused will act as a medium to bind the fine particles of filling together and attach them firmly to a surface containing aluminum, thereby forming a coating on sheets or plates of aluminum, adapting them for use in lithographic work.

I claim herein as my invention:

1. As a new article of manufacture, a metal article containing aluminum and having on its surface and adherent thereto, a flexible vitreous enamel or coating.

2. The method herein described which consists in effecting the fusion of a vitrifiable material on the surface of a metal containing aluminum, whereby a smooth, firmly adherent and flexible vitreous coating is formed on the surface of the metal.

3. The method herein described, which consists in applying to the surface of metal containing aluminum, a thin coating of finely divided vitrifiable material and subjecting the article having the vitrifiable material thereon, to sufficient heat to effect the fusion and adherence of the material to the metal surface.

In testimony whereof, I have hereunto set my hand.

KALMAN WARGA.

Witnesses:
O. HOUNNEL,
JOS. EUANY.